(12) United States Patent
Maes, II et al.

(10) Patent No.: US 12,130,771 B2
(45) Date of Patent: *Oct. 29, 2024

(54) TECHNIQUES FOR RELEASE ASSISTANCE INDICATION ASSERTION

(71) Applicant: ITRON, INC., Liberty Lake, WA (US)

(72) Inventors: Richard Donald Maes, II, Liberty Lake, WA (US); Robert Vernon Dusenberry, Newman Lake, WA (US); Eric S. Benson, Spokane Valley, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,412

(22) Filed: May 26, 2023

(65) Prior Publication Data

US 2023/0297537 A1    Sep. 21, 2023

Related U.S. Application Data

(63) Continuation of application No. 17/348,618, filed on Jun. 15, 2021, now Pat. No. 11,675,733.

(51) Int. Cl.
*G06F 13/42* (2006.01)
*G06F 13/38* (2006.01)
*G06F 13/40* (2006.01)

(52) U.S. Cl.
CPC ........ *G06F 13/4295* (2013.01); *G06F 13/385* (2013.01); *G06F 13/4022* (2013.01); *G06F 13/4059* (2013.01); *G06F 13/4063* (2013.01)

(58) Field of Classification Search
CPC ............. G06F 13/4295; G06F 13/4022; G06F 13/385; G06F 13/4059; G06F 13/4063
See application file for complete search history.

(56) References Cited

U.S. PATENT DOCUMENTS

| 7,409,485 | B1 | 8/2008 | Sartin |
| 9,894,585 | B2 | 2/2018 | Langereis et al. |
| 10,506,543 | B1 | 12/2019 | Edge et al. |
| 11,350,445 | B2 | 5/2022 | Fujishiro et al. |
| 11,818,658 | B2 * | 11/2023 | Maes, II ........... H04W 52/0235 |

(Continued)

OTHER PUBLICATIONS

Notice of Allowance received for U.S. Appl. No. 17/348,622 dated Jun. 28, 2023, 20 pages.

(Continued)

*Primary Examiner* — Brian T Misiura
(74) *Attorney, Agent, or Firm* — Artegis Law Group, LLP

(57) ABSTRACT

Techniques for transmitting data include one or more processors of a computing device included in a network device identifying data to be transmitted, wherein the computing device includes the one or more processors, a queue, and a transmitter, and wherein the network device includes the computing device and a transceiver that is configured to transmit data outside of the network device; adding the data to the queue; and during an open data session window: transmitting, via the transmitter and to the transceiver, data extracted from the queue; and in response to determining that an amount of data in the queue is below a threshold, (a) delaying for a period of time, and (b) after the period of time, instructing the transceiver to end the open data session window early and transition to a lower power state.

20 Claims, 10 Drawing Sheets

(56) References Cited

U.S. PATENT DOCUMENTS

| | | | |
|---|---|---|---|
| 11,830,354 B2 * | 11/2023 | Maes, II | G06F 13/385 |
| 2010/0111058 A1 | 5/2010 | Fischer | |
| 2012/0221833 A1 | 8/2012 | Allaire et al. | |
| 2016/0014240 A1 | 1/2016 | Ghaed et al. | |
| 2016/0029318 A1 | 1/2016 | Gulati et al. | |
| 2018/0014255 A1 | 1/2018 | Pelletier et al. | |
| 2018/0359803 A1 | 12/2018 | Haneji et al. | |
| 2019/0007333 A1 | 1/2019 | Monier et al. | |
| 2019/0053260 A1 | 2/2019 | Shaheen | |
| 2019/0116552 A1 | 4/2019 | Sebeni et al. | |
| 2019/0174472 A1 | 6/2019 | Lee et al. | |
| 2019/0349858 A1 | 11/2019 | Jantzi et al. | |
| 2020/0045765 A1 | 2/2020 | Veeramallu et al. | |
| 2020/0100319 A1 | 3/2020 | Talebi Fard et al. | |
| 2021/0007168 A1 | 1/2021 | Asterjadhi et al. | |
| 2021/0051707 A1 | 2/2021 | Rastegardoost et al. | |
| 2021/0243777 A1 | 8/2021 | Tsai et al. | |
| 2022/0014295 A1 | 1/2022 | Bonde et al. | |
| 2022/0132417 A1 | 4/2022 | Maleki et al. | |
| 2022/0232659 A1 | 7/2022 | Kim et al. | |
| 2022/0256587 A1 | 8/2022 | Fujishiro et al. | |
| 2022/0279601 A1 | 9/2022 | Xue et al. | |
| 2022/0279602 A1 | 9/2022 | Xue et al. | |
| 2022/0398916 A1 | 12/2022 | Maes, II et al. | |
| 2022/0400440 A1 | 12/2022 | Maes, II et al. | |

OTHER PUBLICATIONS

Notice of Allowance received for U.S. Appl. No. 17/348,613 dated Jul. 24, 2023, 11 pages.

3GPP TR 21.915 V15.0.0, "3rd Generation Partnership Project; Technical Specification Group Services and System Aspects, Release 15 Description, Summary of Rel-15 Work Items (Release 15)", 2019, pp. 1-118.

Non Final Office Action received for U.S. Appl. No. 18/483,797 dated May 20, 2024, 50 pages.

Notice of Allowance received for U.S. Appl. No. 18/503,924 dated Jun. 13, 2024, 27 pages.

Notice of Allowance received for U.S. Appl. No. 18/483,797 dated Aug. 28, 2024, 15 pages.

* cited by examiner

TECHNIQUES FOR RELEASE ASSISTANCE INDICATION ASSERTION

CROSS-REFERENCE TO RELATED APPLICATIONS

This application is a continuation of United States patent application titled, "Techniques for Release Assistance Indication Assertion," filed on Jun. 15, 2021, and having Ser. No. 17/348,618. The subject matter of this related application is hereby incorporated herein by reference.

BACKGROUND

Field of the Various Embodiments

Various embodiments of the present disclosure relate generally to wireless network communications and, more specifically, to release assistance indication assertion.

Description of the Related Art

A conventional wireless network, such as a cellular network, includes a plurality of nodes configured to communicate with one another. In a common configuration, a coverage area for a wireless network is obtained by distributing a set of nodes (e.g., base stations, access points, and/or the like) throughout the coverage area. The nodes are networked together through one or more wireless or wired connections and then typically provide access to other networks, such as the Internet. The set of nodes is distributed throughout the coverage area so that an endpoint (e.g., a user device, a data acquisition device, and/or the like) located anywhere in the coverage area is within wireless communication range of at least one of the nodes. A discovery process between an endpoint and one or more nodes of the wireless network allows the endpoint to establish a connection with one of the nodes and use that connection to communicate with other devices also in communication with the wireless network.

To avoid communication interference between the endpoints and the nodes, many wireless networks assign specific time slots or data session windows for each of the endpoints. The time slots assigned to an endpoint specify the time periods when data and/or other information can be exchanged between the endpoint and the node to which the endpoint is connected. This significantly reduces the likelihood that data or information transmitted by one endpoint or node interferes with the data or information transmitted by another endpoint or node. Because an endpoint does not always know when the endpoint is going to receive data or information from the node, the endpoint is typically required to keep the transceiver used to communicate with the node active during an entire time slot so that an incoming transmission from the node is not missed.

Operating the transceiver in an endpoint is fairly power intensive and can often account for a significant portion of the power consumed by the endpoint. For a mains-powered device (MPD), which is connected to a constant power source, such as the electrical grid, the power consumed by the transceiver is typically not a concern. However, for a battery-powered device (BPD), the power consumed by the transceiver plays a significant role in effective battery lifetime. For example, even an otherwise idle BPD, such as a cellular or mobile telephone, requires recharging every day or so. However, for BPDs that are not intended to be regularly recharged or are never intended to be recharged (e.g., a remote data acquisition device, such as a utility meter, an Internet of things (IoT) device, and/or other device designed to have an extended battery lifetime without ever recharging), the power consumed by the transceiver plays a significant role in managing the functional lifetime and/or battery size for the BPD.

Transceiver power consumption issues are addressed, in part, in the upcoming Release 15 of the Third Generation Partnership Project (3GPP) standard. As part of Release 15, the 3GPP standard provides support for a release assistance indication (RAI) feature that allows an endpoint to notify a node that the endpoint will be changing the connection status between the endpoint and the node to idle before the end of a current time slot. This allows the endpoint to terminate the current time slot early and shut down the transceiver without having to wait for permission from the node before doing so. However, even though Release 15 of the 3GPP standard supports RAI between endpoints and nodes, the standard does not describe any techniques for an endpoint to determine when and how the endpoint should use the RAI feature.

As the foregoing illustrates, what is needed in the art are techniques for determining when and how an endpoint should assert RAI.

SUMMARY

Various embodiments of the present disclosure set forth a computer-implemented method for transmitting data. The method includes identifying data to be transmitted, adding the data to a queue, and in response to a data session window being open: extracting the data from the queue; transmitting the extracted data to a transceiver via a transmitter; monitoring an amount of data in the queue and determining that the transmitter has transmitted the extracted data to the transceiver; and in response, instructing the transceiver to end the data session window early and transition to a lower power state.

Other embodiments include, without limitation, a computing device and one or more computer readable media including instructions for performing one or more aspects of the disclosed techniques and an apparatus that implements one or more aspects of the disclosed techniques.

At least one technical advantage of the disclosed techniques relative to the prior art is that, with the disclosed techniques, an endpoint is able to save significant power by asserting RAI to end a data session window early allowing a transceiver of the endpoint to consume less power. By saving power, an effective battery lifetime of the endpoint can be substantially extended. Additionally and/or alternatively, the power savings can also allow an endpoint to achieve a same effective battery lifetime using a smaller and/or less expensive battery than an endpoint not using the disclosed techniques. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
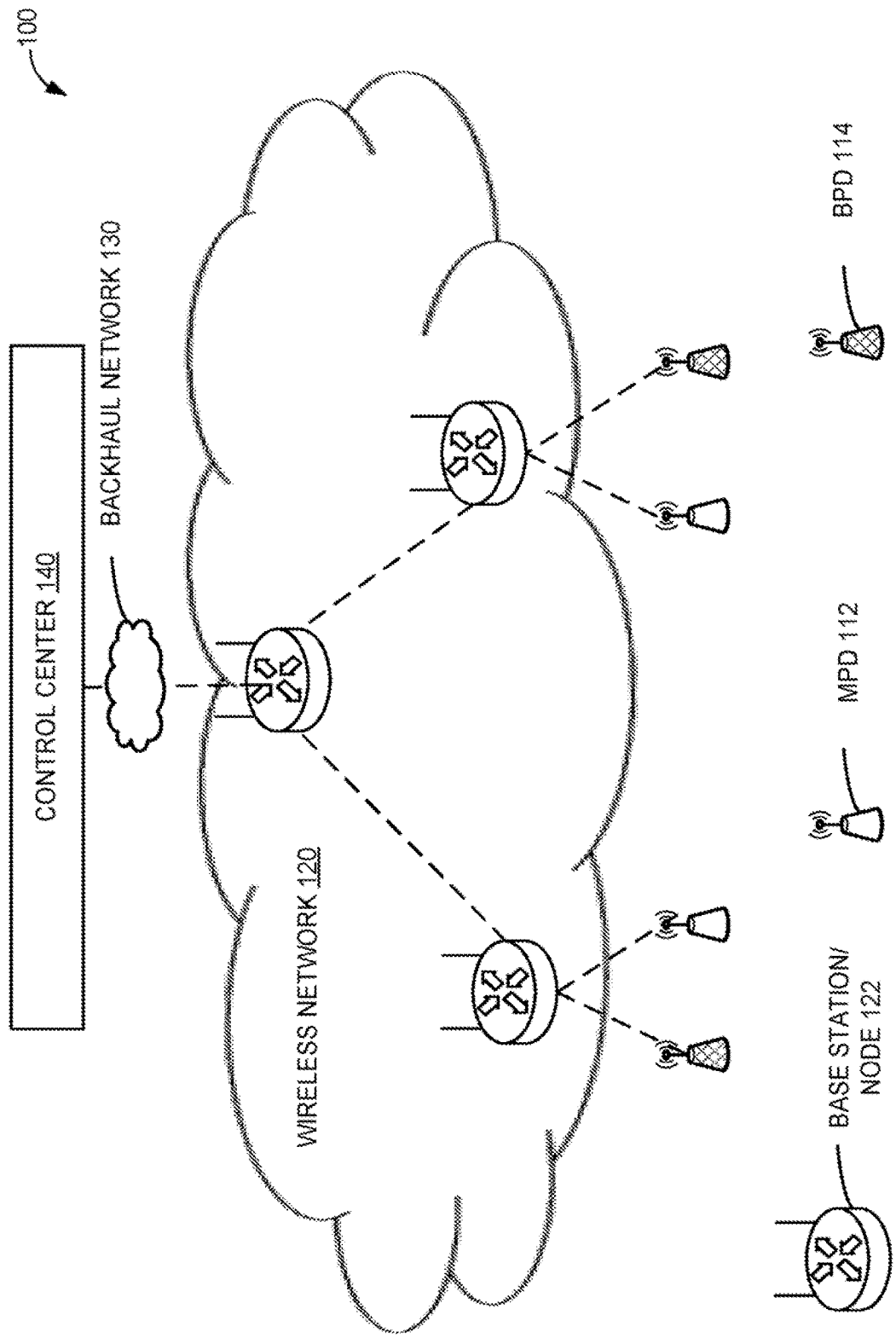
- FIG. 1 illustrates a network system configured to implement one or more aspects of the various embodiments.

FIG. 1 illustrates a network system configured to implement one or more aspects of the present embodiments. As shown, network system 100 includes a plurality of endpoints, a wireless network 120, and a control center 140. The endpoints include mains-powered devices (MPDs) 112 and/or battery-powered devices (BPDs) 114. MPDs 112 draw power from an external power source, such as mains electricity or a power grid. MPDs 112 typically operate on a continuous basis without powering down for extended periods of time. BPDs 114 draw power from an internal power source, such as a battery. BPDs 114 typically operate intermittently and power down for extended periods of time in order to conserve battery power. MPDs 112 and BPDs 114 are configured to gather sensor data, process the sensor data, and communicate data processing results and other information to control center 140 through wireless network 120 and/or one or more backhaul networks 130.

Each of the MPDs 112 and BPDs 114 are configured to communicate with wireless network 120 by establishing wireless communication connections with a base station (or node) 122 in wireless network 120. The wireless communication connections allow MPDs 112 and BPDs 114 to exchange data with base stations 122 in wireless network 120 by transmitting and/or receiving data packets via wireless radio frequency (RF) communications. Each of MPDs 112 and/or BPDs 114 can operate as a source device, an intermediate device, or a destination device for the transmission of any given data packet.

MPDs 112 and/or BPDs 114 can transmit data packets through wireless network 120 to control center 140 and/or receive data packets from control center 140 through wireless network 120. MPDs 112 and/or BPDs 114 can further exchange data packets and/or control packets with base stations 122 in order to establish a connection with a base station 122, maintain a connection with base station 122, and/or exchange data with base station 122.

Wireless network 120 can include one or more base stations 122 located throughout a coverage area in order to provide wireless connectivity to one or more endpoints, such as MPDs 112 and/or BPDs 114 located within the coverage area. Base stations 122 can further be networked together so that an MPD 112 and/or a BPD 114 in connection with one of the base stations 122 is able to transmit data packets to any other device connected to and/or coupled with wireless network 120, such as any of MPDs 112, BPDs 114, base stations 122, and/or the like and/or to devices such as control center 140 coupled through the one or more backhaul networks 130, such as the Internet. In some embodiments, wireless network 120 can be a cellular network, such as a cellular network implementing the 3GPP standard.

Similarly, control center 140 can transmit and/or receive data packets across the one or more backhaul networks 130 and/or wireless network 120. Control center 140 includes one or more server machines (not shown) configured to operate as sources for, or destinations of, data packets that traverse within network system 100. The server machines can query devices (e.g., MPDs 112 and/or BPDs 114) within network system 100 to obtain various data, including raw or processed sensor data, energy consumption data, node/network throughput data, status information, and so forth. The server machines can also transmit commands and/or program instructions to any device within network system 100 to cause those nodes to perform various operations. In some embodiments, each server machine is a computing device configured to execute, via a processor, a software application stored in a memory to perform various network management operations.

Figure 2:
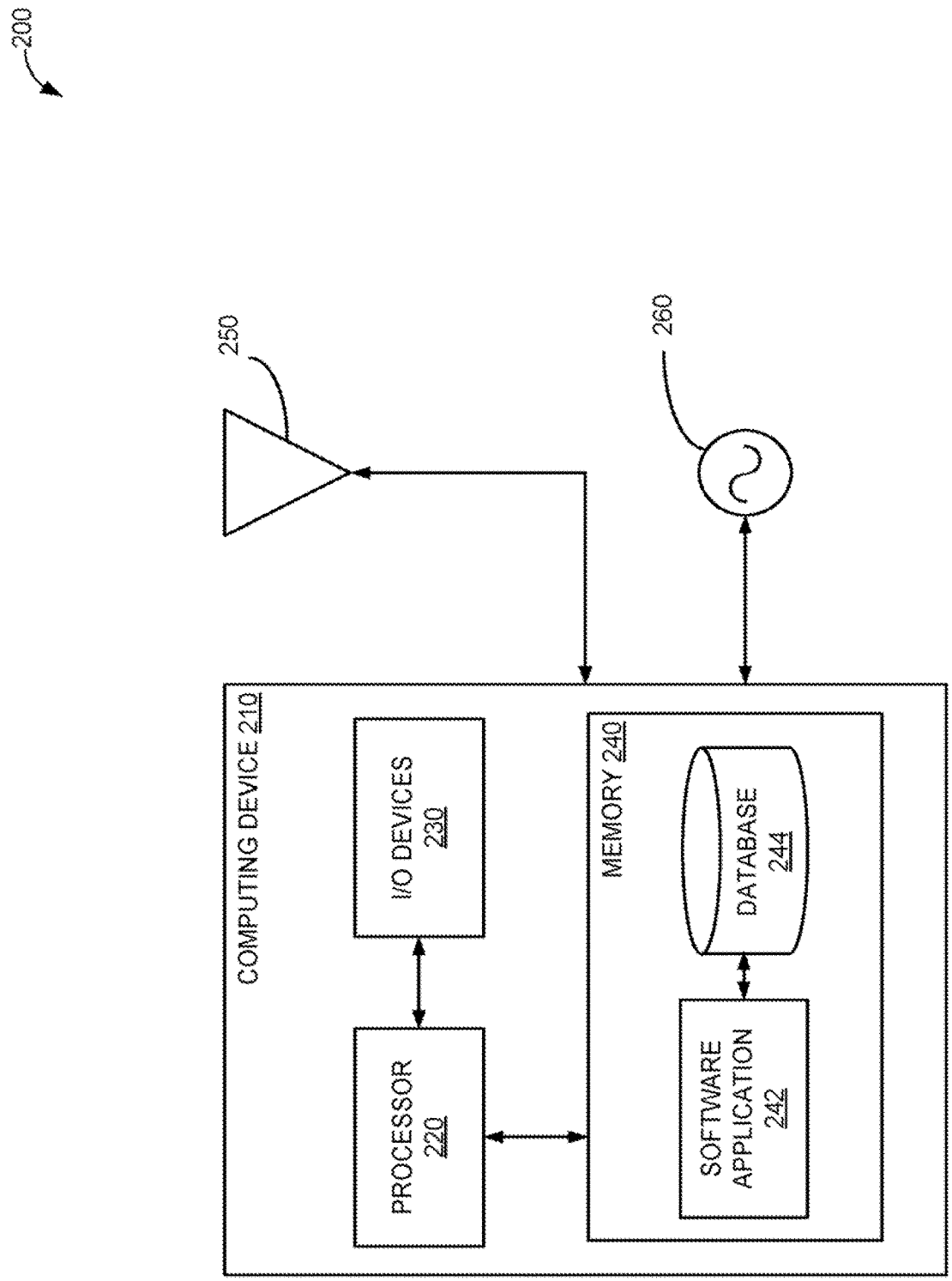
FIG. 2 illustrates a device configured to transmit and receive data within the network system of FIG. 1, according to various embodiments.

MPDs 112 and/or BPDs 114 can likewise include computing device hardware configured to perform processing operations and execute program code. Each MPD 112 and/or BPD 114 can further include various analog-to-digital and digital-to-analog converters, digital signal processors (DSPs), harmonic oscillators, transceivers, and any other components generally associated with RF-based communication hardware. FIG. 2 illustrates an exemplary MPD 112 and/or BPD 114 that can operate within the network system 100.

FIG. 2 illustrates a network device 200 configured to transmit and receive data within network system 100, according to various embodiments. As shown, network device 200 includes a computing device 210 coupled to a wireless transceiver 250 and an oscillator 260. Computing device 210 coordinates the operations of network device 200. Wireless transceiver 250 is configured to transmit and receive data packets across network system 100 using various communication connections. In some embodiments, wireless transceiver 250 can be consistent with any wireless transceiver, such as a cellular modem, a cellular radio, and/or the like. Oscillator 260 provides one or more oscillation signals according to which the transmission and reception of data packets can be scheduled. Network device 200 can be used to implement any of MPDs 112, BPDs 114, and/or base stations 122 of FIG. 1.

Computing device 210 includes a processor 220, input/output (I/O) devices 230, and memory 240, coupled together. Processor 220 can include any hardware configured to process data and execute software applications, such as software application 242. In general, processor 220 retrieves and executes programming instructions stored in memory 240. Processor 220 can be any technically feasible form of processing device configured to process data and execute program instructions. Processor 220 could be, for example, one or more central processing units (CPUs), digital signal processors (DSPs), graphics processing units (GPUs), application-specific integrated circuits (ASICs), field-programmable gate arrays (FPGAs), and/or the like. Processor 220 stores and retrieves application data residing in the memory 240. Processor 220 is included to be representative of a single processor, multiple processors, a single processor having multiple processing cores, and the like. In operation, processor 220 is the master processor of network device 200, controlling and coordinating operations of other system components. Memory 240 stores software applications and data for use by processor 220. Processor 220 executes software applications, such as software application 242, also referred to herein as software application programs, stored within memory 240 and optionally an operating system. In particular, processor 220 executes software instructions and then performs one or more of the functions and operations set forth in the present application.

Processor 220 can include a real-time clock (RTC) (not shown) according to which processor 220 maintains an estimate of the current time. The estimate of the current time can be expressed in Universal Coordinated Time (UTC), although any other standard of time measurement can also be used. I/O devices 230 include devices configured to receive input, devices configured to provide output, and devices configured to both receive input and provide output. Memory 240 can be implemented by any technically feasible storage medium, including RAM, ROM, EPROM, EEPROM, and/or the like.

Memory 240 includes, without limitation, a software application 242 and an optional database 244, coupled together. Software application 242 includes program instructions that, when executed by processor 220, performs any one or more of the computer-based techniques described herein. Software application 242 can also interface with wireless transceiver 250 to establish connections with other devices in network system 100, manage existing connections, coordinate the transmission and reception of data packets across network system 100, and/or the like based on timing signals generated by oscillator 260. Database 244 can include various data structures retrieved by and/or stored by the software application 242.

Wireless Transceiver Operation

As discussed above, one of the tasks of software application 242 is to interface and control wireless transceiver 250. In order to facilitate communication using wireless transceiver 250, software application 242 configures wireless transceiver 250 based on a protocol or standard governing communication between MPD 112 and/or BPD 114 and a base station 122 and/or based on communications parameters negotiated between MPD 112 and/or BPD 114 and base station 122. The communications parameters can include one or more of a frequency band for communication, a signal strength, an encoding scheme, a signaling scheme, packet formats, time slots and/or data session windows for when communication is to take place, and/or the like.

Figure 3A:
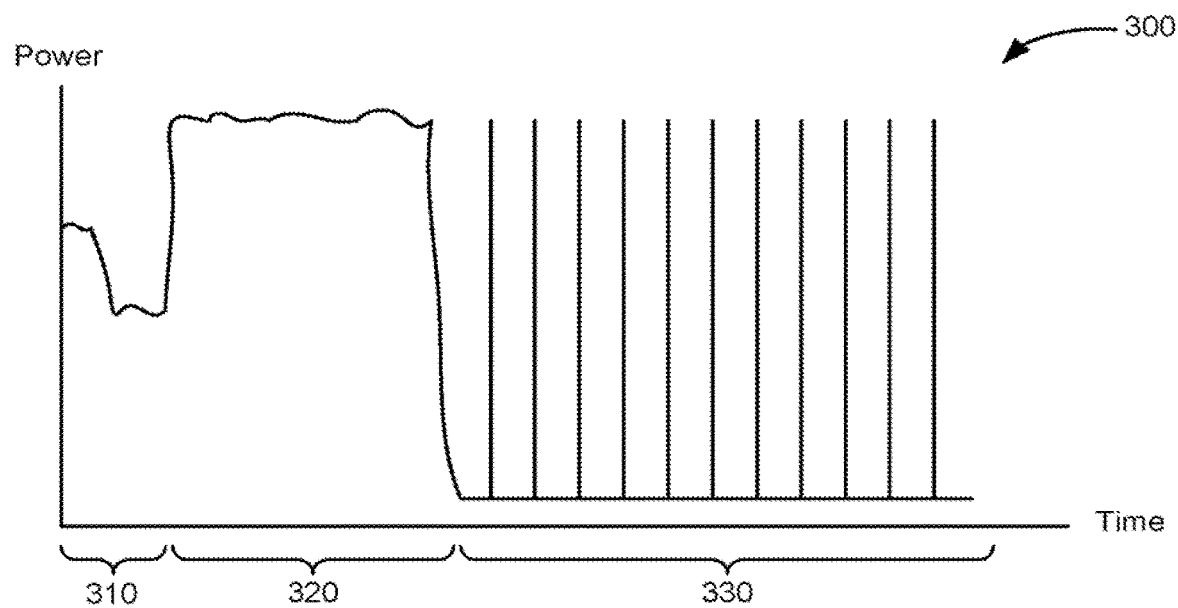
FIG. 3A sets forth a diagram of wireless transceiver operation, according to various embodiments.

FIG. 3A sets forth a diagram of wireless transceiver operation, according to various embodiments. FIG. 3A depicts a simplified power consumption profile 300 for a wireless transceiver, such as wireless transceiver 250, when operating according to a protocol where the device (e.g., MPD 112 and/or BPD 114) using the wireless transceiver is assigned a data session window for sending and/or receiving data packets with another device (e.g., base station 122). In some embodiments, power consumption profile 300 can be consistent with a cellular modem and/or cellular radio operating under a 3GPP or other standard. As shown in FIG. 3A, power consumption profile 300 shows the power consumed by the wireless transceiver during three phases of operation. During a wakeup phase 310, the wireless transceiver is transitioned from an idle state to a fully active state. During the wakeup phase 310, the wireless transceiver can consume power at approximately half of a peak rate of consumption for the wireless transceiver. At the end of wakeup phase 310, the wireless transceiver enters a fully active state and remains in the fully active state for the duration of a data session window 320. When the wireless transceiver is in the fully active state, the wireless transceiver consumes peak or near peak power. During data session window 320, the wireless transceiver is kept in the fully active state so that the wireless transceiver can be used to transmit data packets and/or receive data packets. After data session window 320, the wireless transceiver is transitioned to a housekeeping phase 330 (sometimes called a discontinuous reception phase) where the wireless transceiver is periodically activated to look for paging signals and/or the like. The process of operating the wireless transceiver in wakeup phase 310, data session window 320, and housekeeping phase 330 then repeats around each data session window 320 assigned to the device.

In wireless protocols using data session windows, the wireless transceiver is often required to be kept in the fully active state for the entire duration of the data session window (e.g., data session window 320) even when the device (e.g., MPD 112 and/or BPD 114) using the wireless transceiver does not have any data packets to transmit. This allows the wireless transceiver and the device to receive any data packets, such as unsolicited data packets. For example, the device can receive command and/or other data packets from control center 140. When there are no data packets being exchanged using the wireless transceiver during data session window 320, the wireless transceiver remains in the fully active state where the wireless transceiver continues to consume power at a peak or near peak level.

Figure 3B:
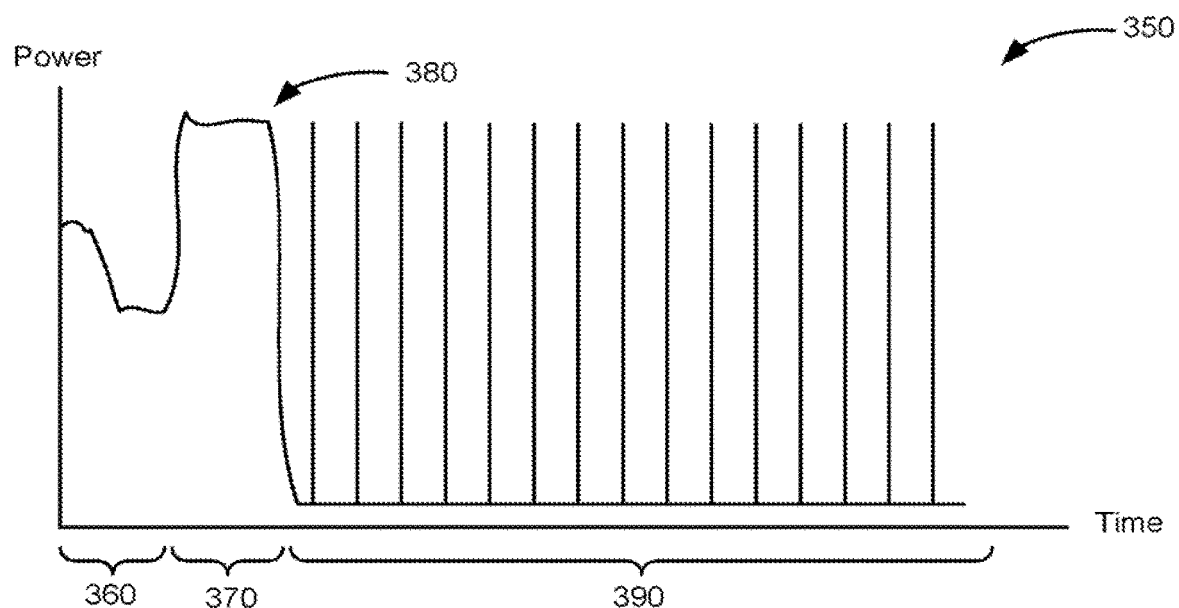
FIG. 3B sets forth a diagram of wireless transceiver operation, according to various other embodiments.

FIG. 3B sets forth a diagram of wireless transceiver operation, according to various other embodiments. FIG. 3B depicts a simplified power consumption profile 350 for a wireless transceiver when operating according to a protocol where the device is assigned a data session window for sending and/or receiving data packets with another device, but also allows the device to terminate the data session window early. For example, the wireless protocol can support early data session window termination using RAI or a similar technique. As shown in FIG. 3B, power consumption profile 350 shows the power consumed by the wireless transceiver during three phases of operation. During a wakeup phase 360, the wireless transceiver is transitioned from an idle state to a fully active state. During the wakeup phase 360, the wireless transceiver can consume power at approximately half of a peak rate of consumption for the wireless transceiver. At the end of wakeup phase 310, the wireless transceiver enters a fully active state for a data session window 370. In contrast to power consumption profile 300 of FIG. 3A, in power consumption profile 350, the device is able to terminate data session window 370 early by asserting an RAI or similar indication at time 380. The RAI allows the device to signal to another device (e.g., a base station 122) that the device is ending data session window 370 and is transitioning to a housekeeping phase 390 early. For example, the device can choose to assert the RAI or other indication when the device has transmitted the data packets ready for transmission during data session window 370.

Advantageously, by ending data session window 370 early, the device is able to transition the wireless transceiver from the high power consumption active state to the much lower power consumption during housekeeping phase 390. As a result, the device is often able to significantly reduce the power consumed by the wireless transceiver. This power reduction can greatly extend battery lifetime in a BPD 114 and/or allow for a longer battery lifetime using a smaller battery in BPD 114.

Release Assistance Indication (RAI) Assertion

Figure 4:
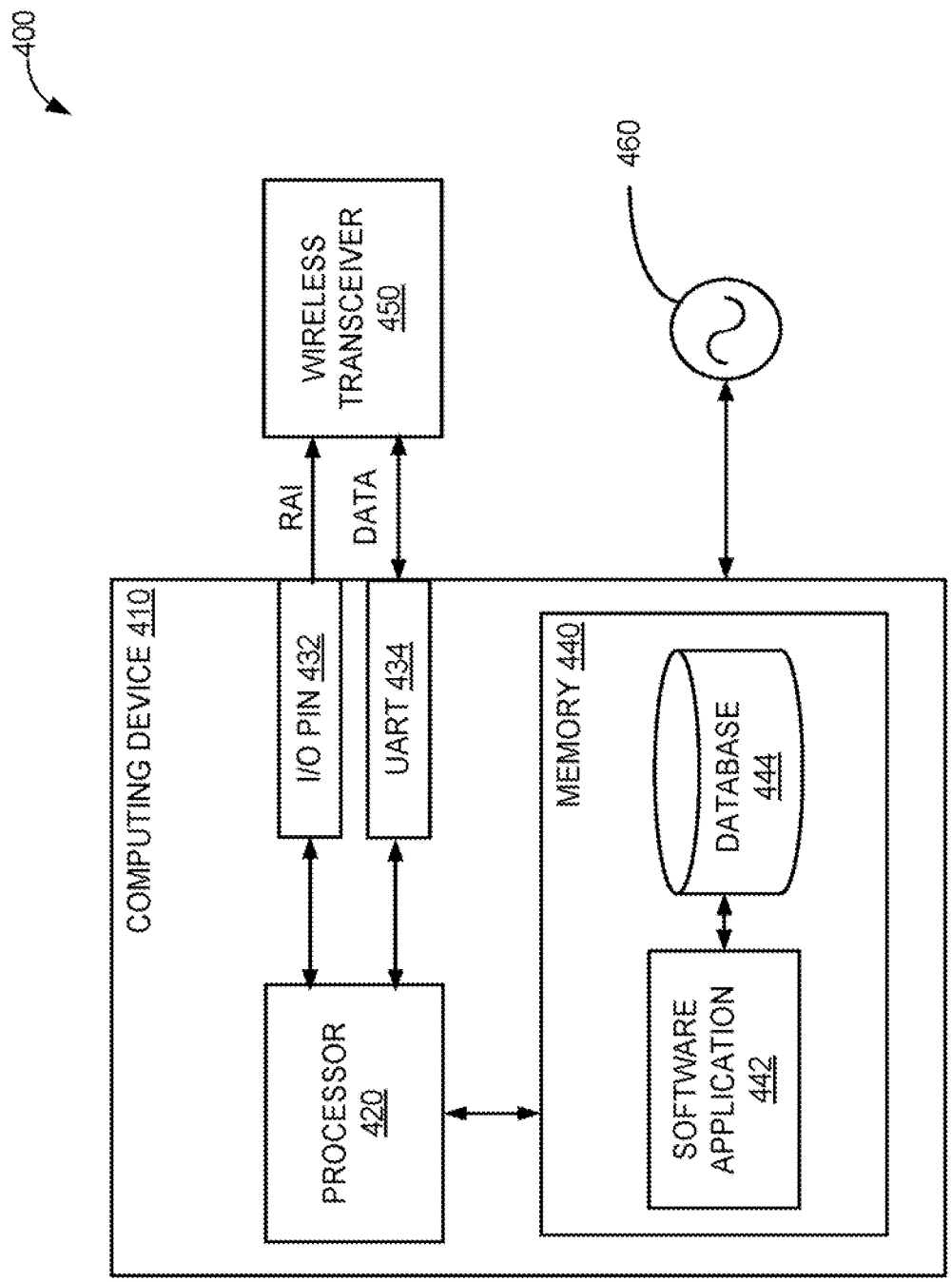
FIG. 4 illustrates a network device within the network system of FIG. 1, according to various embodiments.

FIG. 4 illustrates a network device 400 within network system 100, according to various embodiments. In some embodiments, network device 400 is consistent with any one of MPDs 112, BPDs 114, and/or network device 200. As shown, network device 400 includes a computing device 410 coupled to a wireless transceiver 450 and an oscillator 460. Computing device 410 coordinates the operations of network device 400. Wireless transceiver 450 is configured to transmit and receive data packets across network system 100 using various communication connections. In some embodiments, wireless transceiver 450 can be consistent with any wireless transceiver, such as a cellular modem, a cellular radio, and/or the like. Oscillator 460 provides one or more oscillation signals according to which the transmission and reception of data packets can be scheduled. Network device 400 can be used to implement any of MPDs 112, BPDs 114, and/or base stations 122 of FIG. 1 and/or network device 200 of FIG. 2.

Computing device 410 includes a processor 420, input/output (I/O) pin 432, universal asynchronous receiver transmitter (UART) 434, and memory 440, coupled together. Although not shown, computing device 410 can further include other I/O devices, such as I/O devices 230. Processor 420 can include any hardware configured to process data and execute software applications, such as software application 442. In general, processor 420 retrieves and executes programming instructions stored in memory 440. Processor 420 can be any technically feasible form of processing device configured to process data and execute program instructions. In some embodiments, processor 420 is consistent with processor 220. In operation, processor 420 is the master processor of network device 400, controlling and coordinating operations of other system components. Memory 440 stores software applications and data for use by processor 420. Processor 420 executes software applications, such as software application 442, also referred to herein as software application programs, stored within memory 440 and optionally an operating system. In particular, processor 420 executes software instructions and then performs one or more of the functions and operations set forth in the present application. In some embodiments, memory 440 is consistent with memory 240.

Memory 440 includes, without limitation, a software application 442 and an optional database 444, coupled together. Software application 442 includes program instructions that, when executed by processor 420, performs any one or more of the computer-based techniques described herein. Software application 442 can also interface with wireless transceiver 450 to establish connections with other devices in network system 100, manage existing connections, coordinate the transmission and reception of data packets across network system 100, and/or the like based on timing signals generated by oscillator 460. Database 444 can include various data structures retrieved by and/or stored by the software application 442.

I/O pin 432 is coupled between processor 420 and wireless transceiver 450 in order to provide an RAI command signal to wireless transceiver 450. In response to the RAI command signal, wireless transceiver 450 asserts RAI to notify the device that network device 400 is communicating with that wireless transceiver 450 is ending a current data session window early and is transitioning to a housekeeping phase, such as is consistent with the embodiments of FIG. 3B. The RAI command signal can be any type of digital signal such as an active low indication, an active high indication, a high pulse, a low pulse, and/or the like. I/O pin 432 can be any type of I/O pin including a dedicated RAI pin, a programmable I/O pin, an output only I/O pin, a bi-directional I/O pin, and/or the like. In some embodiments, I/O pin 432 can be programmed using one or more registers (not shown) in computing device 410. In some embodiments, software application 642 can access the functionality of I/O pin 632 using one or more application programming interface (API) functions. In some embodiments, I/O pin 432 can be connected to a dedicated RAI pin on wireless transceiver 450. In other embodiments, I/O pin 432 can be connected to a programmable I/O pin on wireless transceiver 450 that can be programmed to receive the RAI command signal.

UART 434 is coupled between processor 420 and wireless transceiver 450 to provide a data path between network device 400 and wireless transceiver 450. UART 434 receives data from processor 420 (e.g., under the direction of software application 442) that is to be sent to wireless transceiver 450 for transmission to another device in network system 100. UART 434 further receives data from wireless transceiver 450 that is transmitted to network device 400 by other devices in network system 100. The data sent and/or received by UART 434 and/or wireless transceiver 450 can include one or more data packets, and/or the like. The data path between UART 434 and/or wireless transceiver 450 can be any form of data path including a serial data path, a parallel data path, a bus, and/or the like. UART 434 also includes one or more command and/or status registers usable by processor 420 and/or software application 442 to configure, control, and/or monitor UART 434. In some embodiments, UART 434 can further include one or more transmit or receive buffers to temporarily store data being sent to or received from wireless transceiver 450. UART 434 can further be used by processor 420 and/or software application 442 to send commands (e.g., AT commands and/or the like) to wireless transceiver 450. In some embodiments, software application 442 can access the functionality of UART 434 using one or more API functions. And although shown as part of computing device 410, UART 434 can be separate from computing device 410. For example, UART 434 can be on a same board as computing device 410, within a same system on a chip (SoC) as computing device 410, and/or the like.

In operation, software application 442 executing on processor 420 manages the transmission of data from network device 400 to other devices in network system 100, such as control center 140. Software application 442 first identifies data to be transmitted by network device 400. In some embodiments, the data can correspond to data acquired by a data acquisition system associated with network device 400, data obtained from a utility meter, data associated with an IoT device, and/or the like. For example, software application 442 can periodically collect data using one or more sensors that are used to monitor other devices and/or activities. In some examples, the data can be identified and/or acquired by software application 442 before and/or during a current data session window.

Software application 442 then sends the data to wireless transceiver 450 using UART 434. In some examples, software application 442 can send the data to UART 434 before a next data session window begins or can wait until a current data session window begins. In some examples, software application 442 can send one or more data write commands to UART 434 where the data is written into a transmit buffer of UART 434. In response, UART 434 can send the data from the transmit buffer to wireless transceiver 450 using the data path between UART 434 and wireless transceiver 450. In some examples, software application 442 can send the data to UART 434 until UART 434 indicates to software application 442 that a transmit buffer of UART 434 is full, with any additional data remaining to be transmitted being held in a buffer of software application 442 until UART 434 indicates that UART 434 has transmit buffer space available. In some examples, software application 442 can check the status of the transmit buffer by reading one or more status registers of UART 434.

When software application 442 determines that there is no further data ready to be transmitted, software application 442 checks with UART 434 to determine whether the transmit buffer of UART 434 is empty, indicating that UART 434 has transmitted all of the data in the transmit buffer to wireless transceiver 450. As soon as UART 434 indicates that the transmit buffer is empty, software application 442 can send the RAI command signal to wireless transceiver 450 using I/O pin 432. In some embodiments, software application 442 can also delay for a configurable period of time after receiving the indication from UART 434 that the transmit buffer is empty before sending the RAI command signal to wireless transceiver 450 using I/O pin 432. In alternate embodiments, software application 442 can delay for a configurable period of time after sending the last data to UART 434 to allow the transmit buffer of UART 434 to empty before sending the RAI command signal to wireless transceiver 450. In response to receiving the RAI command signal, wireless transceiver 450 asserts RAI to the device (e.g., a base station 122) to which wireless transceiver 450 is wirelessly connected and transitions wireless transceiver 450 from a fully active state to a lower power state, such as the lower power state of housekeeping phase 390.

In some embodiments, software application 442 can use techniques other than the RAI command signal on I/O pin 432 to instruct wireless transceiver 450 to assert RAI and transition to the low power state. In some examples, software application 442 can send a command to wireless transceiver 450 through UART 434 instructing wireless transceiver 450 to assert RAI and transition to the lower power state. In some examples, software application 442 can embed an RAI bit or other flag (e.g., in a header) in a data packet sent to wireless transceiver 450 indicating that RAI can be asserted and the wireless transceiver 450 transitioned to the low power state after transmission of the data packet is complete. Data identified by software application 442 after the RAI command signal is sent is buffered by software application 442 until a next data session window opens.

Software application 442 can also handle other data exchange tasks using UART 434 and/or wireless transceiver 450. In some examples, software application 442 can send additional commands and/or configuration information to UART 434 and/or wireless transceiver 450 and/or receive status information from UART 434 and/or wireless transceiver 450. In some examples, software application 442 can receive data packets from UART 434 and/or wireless transceiver 450 (e.g., from control center 140) and/or respond to the received data packets.

Figure 5:
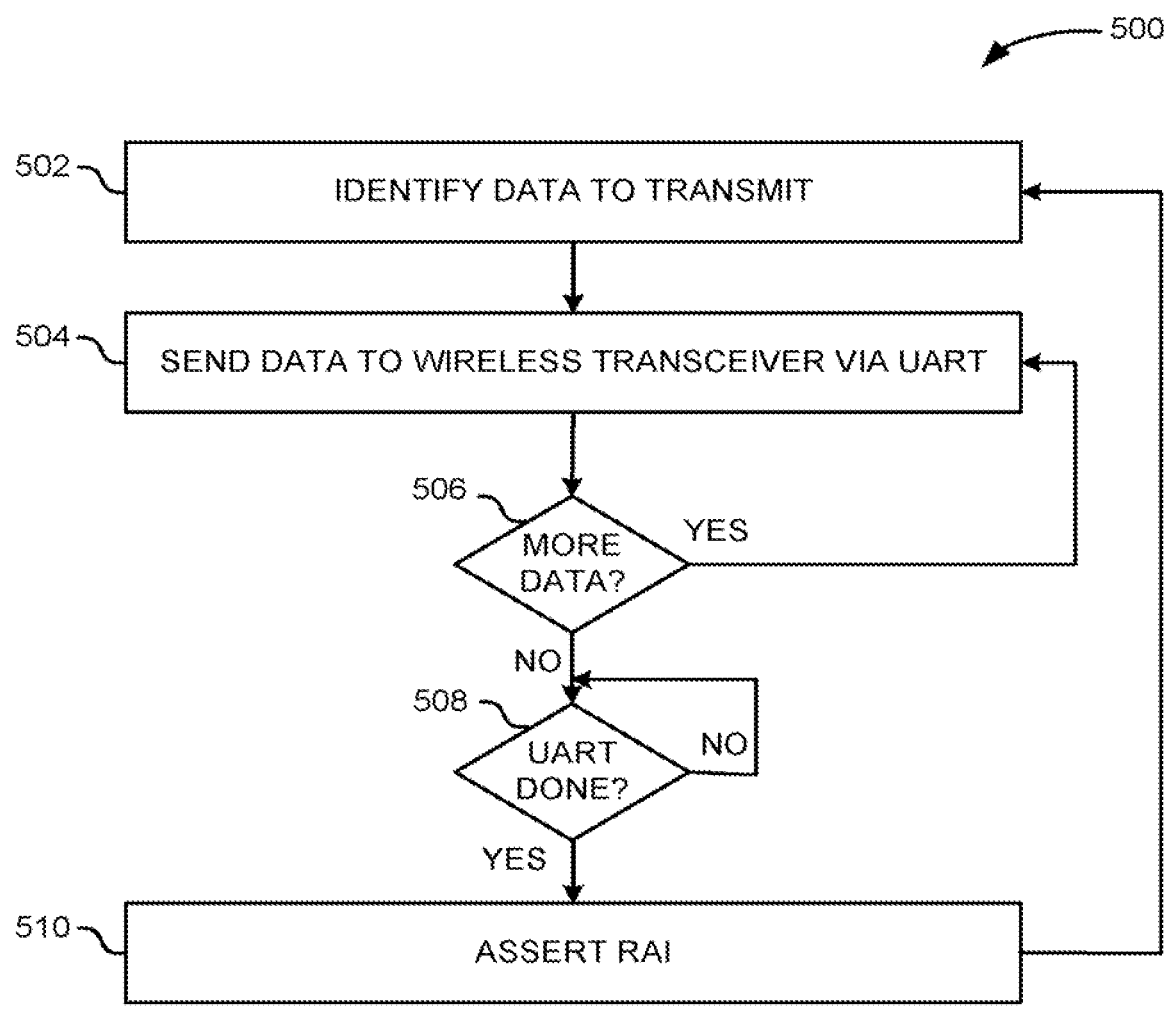
FIG. 5 sets forth a flow diagram of method steps for asserting a release assistance indication, according to various embodiments.

FIG. 5 sets forth a flow diagram of method steps for asserting a release assistance indication, according to various embodiments. Although the method steps are described in conjunction with the systems of FIGS. 1, 2, and/or 4, persons skilled in the art will understand that any system can be configured to perform the method steps in any order. In some embodiments, step 502 can be performed in parallel with steps 504-510.

As shown, a method 500 begins at step 502 where software application 442 executing on processor 420 identifies data to be transmitted. In some embodiments, the data can correspond to data acquired by network device 400 as network device 400 performs operations such as data acquisition and/or other processing. Software application 442 can store the data in one or more buffers, in database 444, and/or the like. In some embodiments, software application 442 can further assemble the data into one or more data packets for transmission over a wireless network using wireless transceiver 450.

At a step 504, software application 442 sends the data identified during step 502 to wireless transceiver 450 using UART 434. For example, software application 442 can send one or more data write commands to UART 434 where the data is written into a transmit buffer of UART 434. In response, UART 434 can send the data from the transmit buffer to wireless transceiver 450 for transmission by wireless transceiver 450 to another device (e.g., a base station 122).

At a step 506, software application 442 determines whether there is any additional data that is ready to send to wireless transceiver 450 for transmission. In some examples, software application 442 can determine whether there is additional data to send by determining whether the one or more buffers of software application 442 are empty and/or whether there is any additional data in database 444 that is ready to send. When there is additional data to send, software application 442 returns to step 504 to send the data to wireless transceiver 450. Additionally and/or alternatively, software application 442 can return to step 502 to determine whether additional data is identified. When there is no additional data to send, software application 442 proceeds to a step 508.

At step 508, software application 442 determines whether UART 434 has finished sending all the data previously sent to UART 434 to wireless transceiver 450. In some examples, software application 442 can read one or more status registers and/or status pins of UART 434 to determine whether the transmit buffer of UART 434 is empty indicating that all the data sent to UART 434 by software application 442 has been sent to wireless transceiver 450. When UART 434 has not finished sending all the data to wireless transceiver 450, software application 442 repeats step 508 until UART 434 indicates that all the data has been sent. Additionally and/or alternatively, software application 442 can repeat one or more of steps 502, 504, and/or 506 before repeating step 508. When UART 434 has finished sending all the data to wireless transceiver 450, software application 442 moves to a step 510.

At step 510, software application 442 begins the process for asserting RAI. In some examples, software application 442 sends an RAI command signal to wireless transceiver 450 using I/O pin 432 to instruct wireless transceiver to assert RAI. In some examples, software application 442 can send a command to wireless transceiver 450 using UART 434 and/or embed an RAI bit or flag in a last data packet sent to wireless transceiver 450. After instructing wireless transceiver 450 to assert RAI, software application 442 returns to step 502 to repeat method 500 for another data session window.

Figure 6:
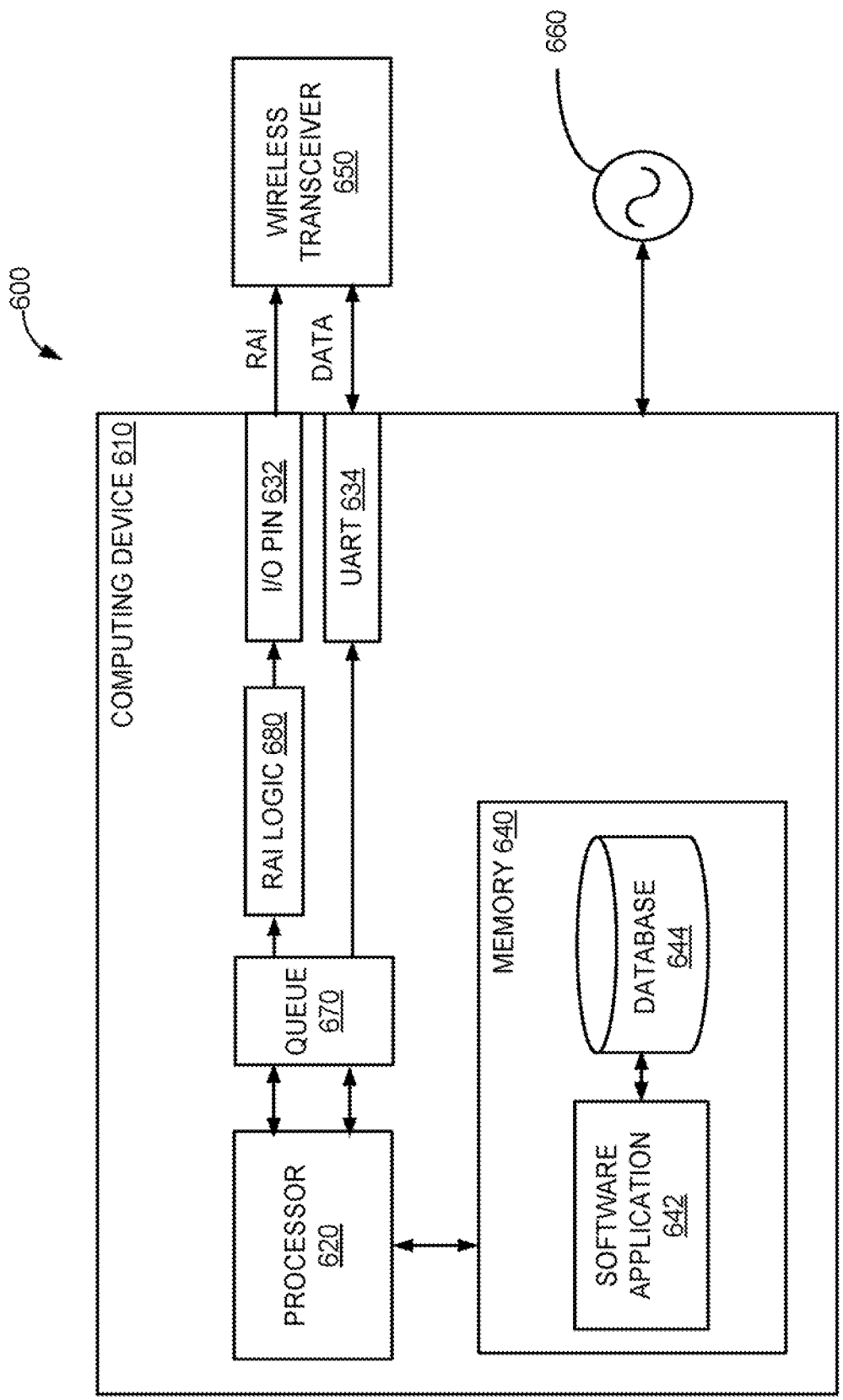
FIG. 6 illustrates a network device within the network system of FIG. 1, according to various other embodiments.

FIG. 6 illustrates a network device 600 within network system 100, according to various other embodiments. As shown, network device 600 includes a computing device 610 coupled to a wireless transceiver 650 and an oscillator 660. Computing device 610 coordinates the operations of network device 600. Wireless transceiver 650 is configured to transmit and receive data packets across network system 100 using various communication connections. In some embodiments, wireless transceiver 650 can be consistent with any wireless transceiver, such as a cellular modem, a cellular radio, and/or the like. Oscillator 660 provides one or more oscillation signals according to which the transmission and reception of data packets can be scheduled. Network device 600 can be used to implement any of MPDs 112, BPDs 114, and/or base stations 122 of FIG. 1 and/or network device 200 of FIG. 2.

Computing device 610 includes a processor 620, input/output (I/O) pin 632, UART 634, memory 640, queue 670, and RAI logic 680 coupled together. Although not shown, computing device 610 can further include other I/O devices, such as I/O devices 230. Processor 620 can include any hardware configured to process data and execute software applications, such as software application 642. In general, processor 620 retrieves and executes programming instructions stored in memory 640. Processor 620 can be any technically feasible form of processing device configured to process data and execute program instructions. In some embodiments, processor 620 is consistent with processor 220. In operation, processor 620 is the master processor of network device 600, controlling and coordinating operations of other system components. Memory 640 stores software applications and data for use by processor 620. Processor 620 executes software applications, such as software application 642, also referred to herein as software application programs, stored within memory 640 and optionally an operating system. In particular, processor 620 executes software instructions and then performs one or more of the functions and operations set forth in the present application. In some embodiments, memory 640 is consistent with memory 240.

Memory 640 includes, without limitation, a software application 642 and an optional database 644, coupled together. Software application 642 includes program instructions that, when executed by processor 620, performs any one or more of the computer-based techniques described herein. Software application 642 can also interface with wireless transceiver 650 to establish connections with other devices in network system 100, manage existing connections, coordinate the transmission and reception of data packets across network system 100, and/or the like based on timing signals generated by oscillator 660. Database 644 can include various data structures retrieved by and/or stored by the software application 642.

I/O pin 632 is coupled between RAI logic 680 and wireless transceiver 650 in order to provide an RAI command signal to wireless transceiver 650. In response to the RAI command signal, wireless transceiver 650 asserts RAI to notify the device that network device 600 is communicating with that wireless transceiver 650 is ending a current data session window early and is transitioning to a housekeeping phase, such as is consistent with the embodiments of FIG. 3B. The RAI command signal can be any type of digital signal such as an active low indication, an active high indication, a high pulse, a low pulse, and/or the like. I/O pin 632 can be any type of I/O pin including a dedicated RAI pin, a programmable I/O pin, an output only I/O pin, a bi-directional I/O pin, and/or the like. In some embodiments, I/O pin 632 can be programmed using one or more registers (not shown) in computing device 610. In some embodiments, software application 642 can access the functionality of I/O pin 632 using one or more API functions. In some embodiments, I/O pin 632 can be connected to a dedicated RAI pin on wireless transceiver 650. In other embodiments, I/O pin 632 can be connected to a programmable I/O pin on wireless transceiver 650 that can be programmed to receive the RAI command signal.

UART 634 couples computing device 610 to wireless transceiver 650 to provide a data path between computing device 610 and wireless transceiver 650. UART 634 receives data from processor 620 (e.g., under the direction of software application 642 and/or through queue 670) that is to be sent to wireless transceiver 650 for transmission to another device in network system 100. UART 634 further receives data from wireless transceiver 650 that is transmitted to network device 600 by other devices in network system 100. The data sent and/or received by UART 634 and/or wireless transceiver 650 can include one or more data packets, and/or the like. The data path between UART 634 and/or wireless transceiver 650 can be any form of data path including a serial data path, a parallel data path, a bus, and/or the like. UART 634 also includes one or more command and/or status registers usable by processor 620 and/or software application 642 to configure, control, and/or monitor UART 634. In some embodiments, UART 634 can further include one or more transmit or receive buffers to temporarily store data being sent to or received from wireless transceiver 650. UART 634 can further be used by processor 620 and/or software application 642 to send commands (e.g., AT commands and/or the like) to wireless transceiver 650. In some embodiments UART 634 can be similar to UART 434 except that UART 634 can have a smaller or no transmit buffer allowing UART 634 to be less complex than UART 434. In some embodiments, software application 642 can access the functionality of UART 634 using one or more API functions. And although shown as part of computing device 610, UART 634 can be separate from computing device 610. For example, UART 634 can be on a same board as computing device 610, within a same system on a chip (SoC) as computing device 610, and/or the like.

Queue 670 is responsible for storing the data before the data is transmitted by computing device 610 and/or software application 642 using wireless transceiver 650. In practice, queue 670 is a first-in first-out (FIFO) queue. As software application 642 identifies data to be transmitted, this data is provided to queue 670. As UART 634 is able to accept more data to be sent to wireless transceiver 650, the data is removed from queue 670 and sent to UART 634. For example, during a data session window (e.g., data session window 370), when wireless transceiver 650 is able to transmit data over the wireless network, data is removed from queue 670 (e.g., in FIFO order) and sent to UART 634 where the data is then sent to wireless transceiver 650. In some embodiments, the transfer of data from queue 670 to UART 634 depends on whether UART 634 is ready to receive additional data with the UART 634 indicating whether UART 634 has empty space in a transmit buffer to receive additional data.

Queue 670 further provides an indication of the amount of data in queue 670 (e.g., data not yet transmitted by UART 634) to RAI logic 680. In some examples, queue 670 provides a bit or other flag to RAI logic 680 indicating when queue 670 is empty and does not have any further data to transmit. In some embodiments, software application 642 can access the functionality of queue 670 using one or more API functions.

RAI logic 680 monitors the amount of data in queue 670 to determine when to send an RAI command signal to wireless transceiver 650 using I/O pin 632. In some examples, RAI logic 680 monitors the bit or other flag indicating when queue 670 is empty and generates the RAI command signal in response. In some examples, RAI logic 680 can additionally insert a configurable delay between receiving the bit or other flag indicating when queue 670 is empty and the generation of the RAI command signal, such as to account for a delay between queue 670 becoming empty and UART 634 transmitting the last of the data to wireless transceiver 650. In some embodiments, software application 642 can access the functionality of RAI logic 680 using one or more API functions.

As shown in FIG. 6, queue 670 and/or RAI logic 680 are implemented in hardware as part of computing device 610. Queue 670 and/or RAI logic 680 can be implemented using any hardware-based approach including using one or more integrated hardware elements of computing device 610, one or more programmable devices, one or more FPGAs, one or more ASICs and/or the like. In some embodiments, queue 670 and/or RAI logic 680 can be separate from computing device 410. For example, queue 670 and/or RAI logic 680 can be on a same board as computing device 610, within a same system on a chip (SoC) as computing device 610, and/or the like. In embodiments where RAI logic 680 is separate from computing device 610, I/O pin 632 can be omitted and/or implemented as an I/O pin on the device where RAI logic 680 is located. And although queue 670 and RAI logic 680 are depicted as hardware elements, some or all of queue 670 and/or RAI logic 680 can be implemented in software either as part of software application 642 and/or in software separate from software application 642.

In operation, software application 642 executing on processor 620 manages the transmission of data from network device 600 to other devices in network system 100, such as control center 140. Software application 642 first identifies data to be transmitted by network device 600. In some embodiments, the data can correspond to data acquired by a data acquisition system associated with network device 600, data obtained from a utility meter, data associated with an IoT device, and/or the like. For example, software application 642 can periodically collect data using one or more sensors that are used to monitor other devices and/or activities. In some examples, the data can be identified and/or acquired by software application 642 before and/or during a current data session window.

Software application 642 then adds the data to queue 670 indicating that the data is to be eventually transmitted by wireless transceiver 650. In some examples, software application 642 can add the data to queue 670 after the data is identified or can wait until a current data session window begins before adding the data to queue 670.

When a data session window is open, the data is removed from queue 670 and then passed to UART 634, which then sends the data to wireless transceiver 650 for transmission over the wireless network. In some embodiments, the data can be removed from queue 670 and sent to UART 634 under the direction of software application 642 and/or under the direction of hardware and/or software within queue 670. When RAI logic 680 determines that queue 670 is empty, indicating that there is no further data ready to be transmitted, RAI logic 680 sends an RAI command signal to wireless transmitter 650 using I/O pin 632. In some examples, RAI logic 680 can delay before sending the RAI command signal, such as to account for a delay between queue 670 becoming empty and UART 634 transmitting the last of the data to wireless transceiver 650.

In response to receiving the RAI command signal, wireless transceiver 650 asserts RAI to the device (e.g., a base station 122) to which wireless transceiver 650 is wirelessly connected and transitions wireless transceiver 650 from a fully active state to a lower power state, such as the lower power state of housekeeping phase 390. Data identified by software application 642 after the RAI command signal is sent is added to queue 670 by software application 642, where the data is held until a next data session window opens and data is again removed from queue 670 and sent to UART 634 for transmission by wireless transceiver 650.

In some embodiments, RAI logic 680 can use techniques other than the RAI command signal on I/O pin 632 to instruct wireless transceiver 650 to assert RAI and transition to the low power state. In some examples, RAI logic 680 can send a command to wireless transceiver 650 through UART 634 and/or add a command to queue 670 instructing wireless transceiver 650 to assert RAI and transition to the lower power state.

Software application 642 can also handle other data exchange tasks using UART 634 and/or wireless transceiver 650. In some examples, software application 642 can send additional commands and/or configuration information to UART 634 and/or wireless transceiver 650 and/or receive status information from UART 634 and/or wireless transceiver 650. In some examples, software application 642 can receive data packets from UART 634 and/or wireless transceiver 650 (e.g., from control center 140) and/or respond to the received data packets.

Figure 7:
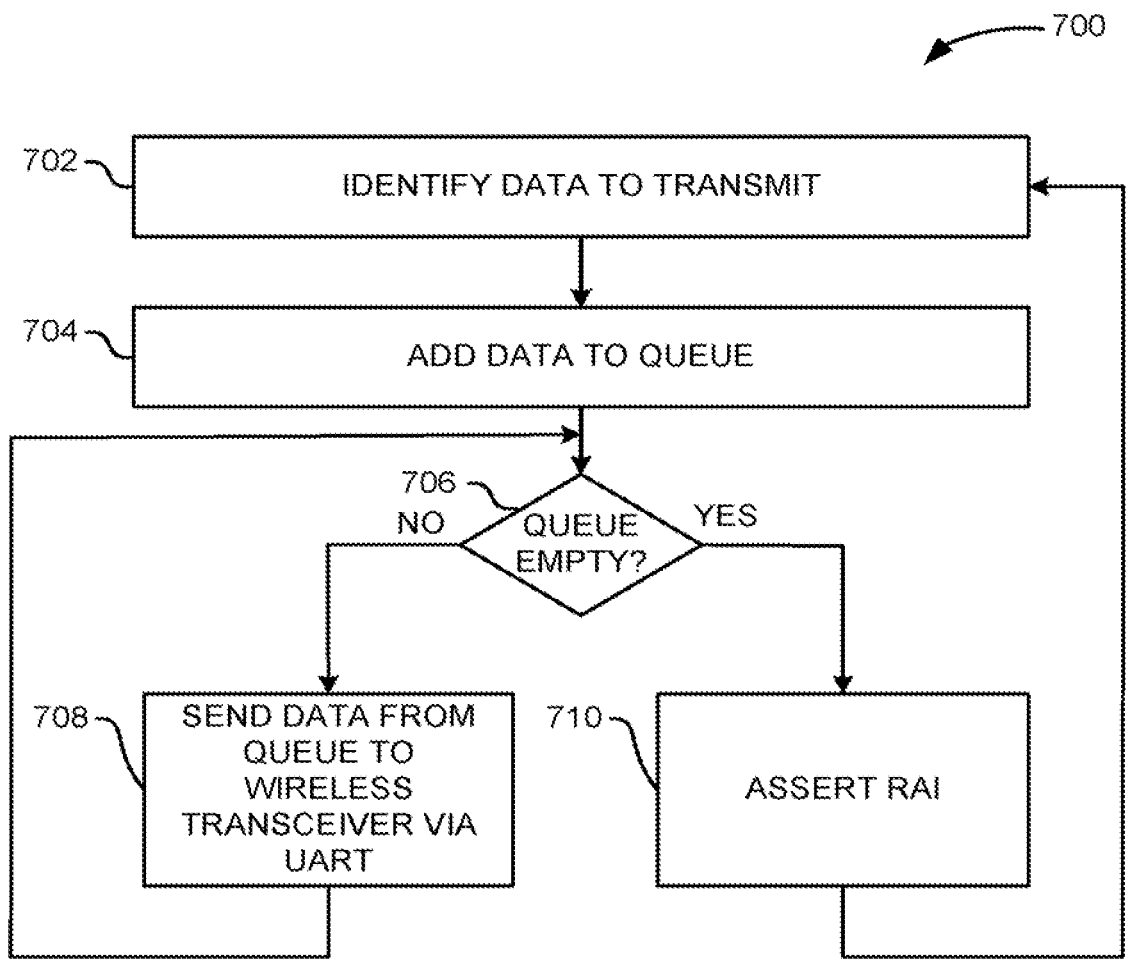
FIG. 7 sets forth a flow diagram of method steps for asserting a release assistance indication, according to various other embodiments.

FIG. 7 sets forth a flow diagram of method steps for asserting a release assistance indication, according to various other embodiments. Although the method steps are described in conjunction with the systems of FIGS. 1, 2, and/or 6, persons skilled in the art will understand that any system can be configured to perform the method steps in any order. In some embodiments, steps 702 and 704 can be performed in parallel with steps 706-710.

As shown, a method 700 begins at step 702 where software application 642 executing on processor 620 identifies data to be transmitted. In some embodiments, the data can correspond to data acquired by network device 600 as network device 600 performs operations such as data acquisition and/or other processing.

At a step 704, software application 642 adds the data identified during step 702 to queue 670. For example, software application 642 can use one or more API functions to add the data to queue 670. In some embodiments, software application 642 can further assemble the data into one or more data packets before adding the data to queue 670.

At a step 706, a module, such as RAI logic 680, determines whether queue 670 is empty. In some examples, RAI logic 680 monitors a queue empty bit or flag provided by queue 670 to determine when queue 670 is empty. When queue 670 is not empty, method 700 continues with a step 708. When queue 670 is empty, method 700 continues with a step 710.

At step 708, data is sent from queue 670 to wireless transceiver 650 via UART 634. For example, software application 642 and/or queue 670 remove data from queue 670 in FIFO order and provide the data to UART 634 when UART 634 indicates that there is space in a transmit buffer for UART 634 to receive additional data. UART 634 then sends the data to wireless transceiver 650 for transmission over the wireless network to another device (e.g., a base station 122). Method 700 then returns to step 706 to again check whether queue 670 is empty. In some embodiments, steps 702 and/or 704 can be performed in parallel with step 708 so that while data is being sent from queue 670 to wireless transceiver 650, additional data can be identified and/or added to queue 670 using steps 702 and/or 704.

At step 710, RAI logic 680 begins the process for asserting RAI. In some examples, RAI logic 680 sends an RAI command signal to wireless transceiver 650 using I/O pin 632 to instruct wireless transceiver 650 to assert RAI. In some examples, RAI logic 680 can send a command to wireless transceiver 650 using UART 634 and/or add a command to queue 670 to provide the RAI command signal to wireless transceiver 650. After instructing wireless transceiver 650 to assert RAI, method 700 is repeated by returning to step 702.

Figure 8:
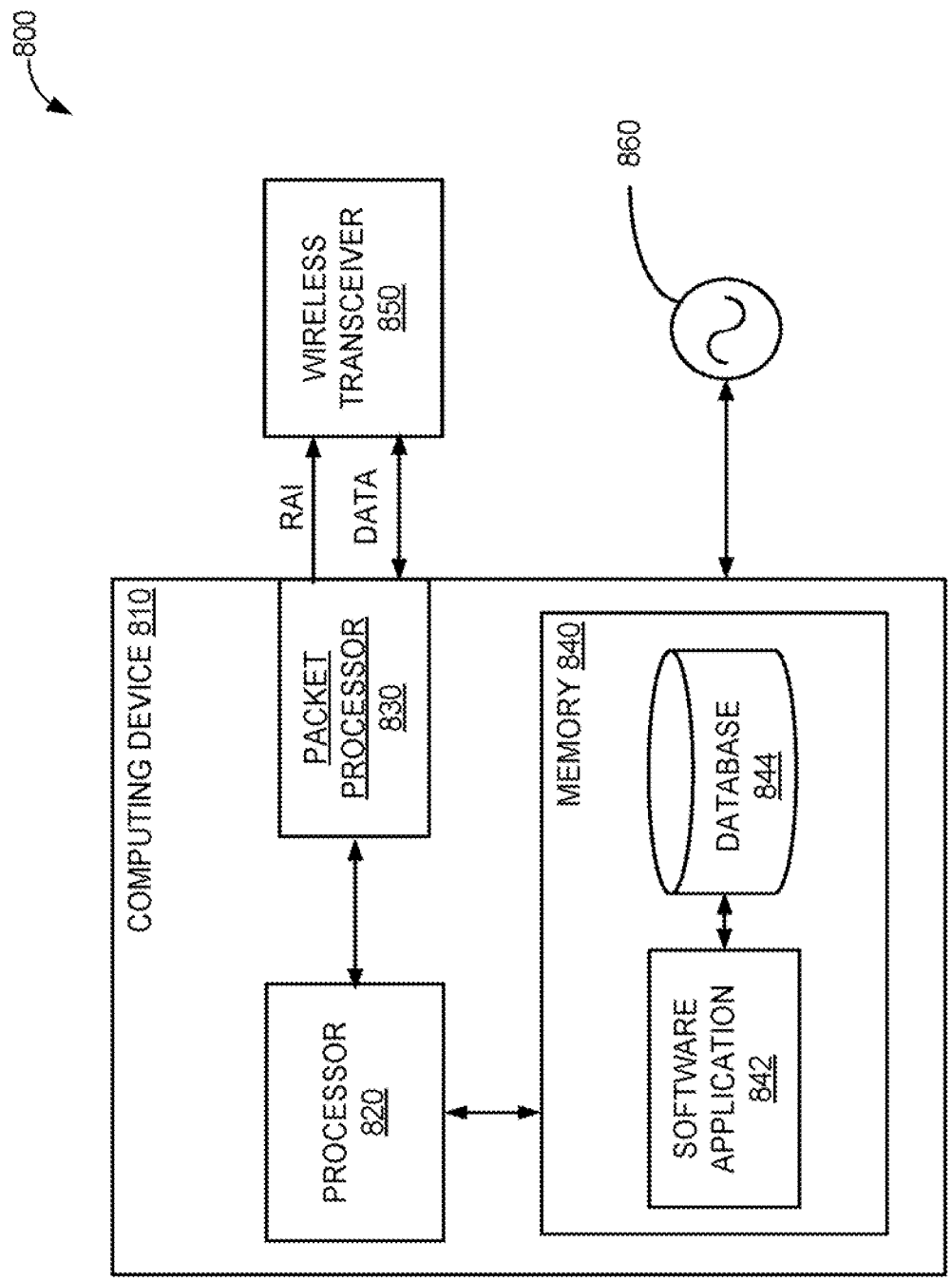
FIG. 8 illustrates a network device within the network system of FIG. 1, according to various additional embodiments.

FIG. 8 illustrates a network device 800 within network system 100, according to various additional embodiments. As shown, network device 800 includes a computing device 810 coupled to a wireless transceiver 850 and an oscillator 860. Computing device 810 coordinates the operations of network device 800. Wireless transceiver 850 is configured to transmit and receive data packets across network system 100 using various communication connections. In some embodiments, wireless transceiver 850 can be consistent with any wireless transceiver, such as a cellular modem, a cellular radio, and/or the like. Oscillator 860 provides one or more oscillation signals according to which the transmission and reception of data packets can be scheduled. Network device 800 can be used to implement any of MPDs 112, BPDs 114, and/or base stations 122 of FIG. 1 and/or network device 200 of FIG. 2.

Computing device 810 includes a processor 820, a packet processor 830, and memory 840 coupled together. Although not shown, computing device 810 can further include other I/O devices, such as I/O devices 230. Processor 820 can include any hardware configured to process data and execute software applications, such as software application 842. In general, processor 820 retrieves and executes programming instructions stored in memory 840. Processor 820 can be any technically feasible form of processing device configured to process data and execute program instructions. In some embodiments, processor 820 is consistent with processor 220. In operation, processor 820 is the master processor of network device 800, controlling and coordinating operations of other system components. Memory 840 stores software applications and data for use by processor 820. Processor 820 executes software applications, such as software application 842, also referred to herein as software application programs, stored within memory 840 and optionally an operating system. In particular, processor 820 executes software instructions and then performs one or more of the functions and operations set forth in the present application. In some embodiments, memory 840 is consistent with memory 240.

Memory 840 includes, without limitation, a software application 842 and an optional database 844, coupled together. Software application 842 includes program instructions that, when executed by processor 820, performs any one or more of the computer-based techniques described herein. Software application 842 can also interface with wireless transceiver 850 to establish connections with other devices in network system 100, manage existing connections, coordinate the transmission and reception of data packets across network system 100, and/or the like based on timing signals generated by oscillator 860. Database 844 can include various data structures retrieved by and/or stored by the software application 842.

In operation, software application 842 executing on processor 820 manages the transmission of data from network device 800 to other devices in network system 100, such as control center 140. Software application 842 first identifies data to be transmitted by network device 800. In some embodiments, the data can correspond to data acquired by a data acquisition system associated with network device 800, data obtained from a utility meter, data associated with an IoT device, and/or the like. For example, software application 842 can periodically collect data using one or more sensors that are used to monitor other devices and/or activities. In some examples, the data can be identified and/or acquired by software application 842 before and/or during a current data session window.

Software application 842 then converts the data into one or more messages. Each of the one or more messages includes a header and a payload that includes at least some of the data that software application 842 wants to be transmitted wirelessly using wireless transceiver 850. The header in each of the messages can include one or more bits and/or fields that are used to control the behavior of packet processor 830 and/or wireless transceiver 850. Software application 842 uses at least one of these bits or fields to indicate whether the message is a last message to be transmitted or whether additional messages for transmission will be sent. For example, the bit or field can correspond to an end of transmission (EOT) bit or field. In examples, where the EOT is a bit, a last message can be identified by a 1 value and a non-last message can be identified by a 0 value, or vice versa.

Software application 842 then sends each of the messages to packet processor 830 so that each of the messages except the last message sent to packet processor 830 include the indicator that that message is not a last message and the last message sent to packet processor 830 includes the indicator that that message is the last message. Software application 842 sends each of the messages to packet processor 830 using a communication path between processor 820 and packet processor 830. In some embodiments, the communication path can include one or more buses, I/O ports, and/or the like.

Packet processor 830 handles communication between computing device 810 and wireless transceiver 850. Although not shown in FIG. 8, packet processor 830 includes a control unit and a transmission buffer or queue, such as a FIFO queue similar to queue 670. The control unit can include any hardware configured to process data and coordinate the operation of packet processor 830. In some embodiments, the control unit can include one or more CPUs, DSPs, GPUs, ASICs, FPGAs, hardware controllers, and/or the like. In some embodiments, the control unit can execute instructions stored in a memory.

When packet processor 830 receives a message, a control unit (not shown) in packet processor 830 adds the message to the queue. This allows software application 842 to generate and send messages to packet processor 830 without software application 842 having to worry about whether a data session window is open or deal with the timing of sending messages to wireless transceiver 850 for transmission over the wireless network.

Separately from the receiving of messages and the adding messages to the queue, packet processor 830 further extracts messages from the queue in FIFO order for further processing. In some embodiments, packet processor 830 waits to extract messages from the queue until a data session window opens. The further processing includes forwarding at least the payload (e.g., the data that software application 842 wants transmitted) from the message to wireless transceiver 850 for transmission over the wireless network. In some embodiments, packet processor 830 can also forward some or all of the header of the message to wireless transceiver 850. Thus, in practice, packet processor 830 can strip some, all, or none of the headers from the message before forwarding the message to wireless transceiver 850. In some embodiments, packet processor 830 only forwards messages and/or the payloads of messages to wireless transceiver 850 when a data session window is open. In some embodiments, packet processor 830 can include a UART similar to UART 434 and/or UART 634 to forward the messages to wireless transceiver 850.

As packet processor 830 processes a message extracted from the queue, packet processor 830 examines the header of the message to determine whether the message is a last message or not, such as by examining the EOT bit or field. When the message is a last message, packet processor 830 provides an RAI command signal to wireless transceiver 850. In response to the RAI command signal, wireless transceiver 850 asserts RAI to notify the device that network device 800 is communicating with that wireless transceiver 850 is ending a current data session window early and is transitioning to a housekeeping phase, such as is consistent with the embodiments of FIG. 3B. In some examples, packet processor 830 can wait a configurable period of time after forwarding the message with the last message indicator to wireless transceiver 850 before providing the RAI command signal to wireless transceiver 850. The RAI command signal can be any type of digital signal such as an active low indication, an active high indication, a high pulse, a low pulse, and/or the like. In some embodiments, packet processor 830 can provide the RAI command signal on an I/O pin consistent with I/O pin 432 and/or I/O pin 632. In some embodiments, the I/O pin of packet processor 830 can be connected to a dedicated RAI pin on wireless transceiver 850. In other embodiments, the I/O pin of packet processor 830 can be connected to a programmable I/O pin on wireless transceiver 850 that can be programmed to receive the RAI command signal.

In some embodiments, packet processor 830 can use techniques other than the RAI command signal on the I/O pin to instruct wireless transceiver 850 to assert RAI and transition to the low power state. In some examples, packet processor 830 can send a command to wireless transceiver 850 after forwarding the last message instructing wireless transceiver 850 to assert RAI and transition to the lower power state. In some examples, packet processor 830 can embed an RAI bit or other flag (e.g., in the header) of the last message forwarded to wireless transceiver 850 indicating that RAI can be asserted and the wireless transceiver 850 transitioned to the low power state after transmission of the data packet is complete. In some embodiments, packet processor 830 can leave the EOT or other indicator in the last message forwarded to wireless transceiver 850 to act as the RAI command signal.

Packet processor 830 can be implemented using any hardware-based approach including using one or more integrated hardware elements of computing device 610, one or more programmable devices, one or more FPGAs, one or more ASICs and/or the like. In some embodiments, packet processor 830 can be separate from computing device 810. For example, packet processor 830 can be on a same board as computing device 810, within a same system on a chip (SoC) as computing device 810, and/or the like. And although packet processor 830 is depicted as a hardware element, some or all of packet processor 830 can be implemented in software either as part of software application 842 and/or in software separate from software application 842.

Software application 842 and packet processor 830 can also handle other data exchange tasks. In some examples, software application 842 can send additional commands and/or configuration information to packet processor 830 and/or wireless transceiver 850 and/or receive status information from packet processor 830 and/or wireless transceiver 850. In some examples, packet processor 830 can send additional commands and/or configuration information to wireless transceiver 850 and/or receive status information from wireless transceiver 850. In some examples, software application 842 and/or packet processor 830 can receive data packets and/or other messages from wireless transceiver 850 (e.g., from control center 140) and/or respond to the received data packets or messages.

Figure 9:
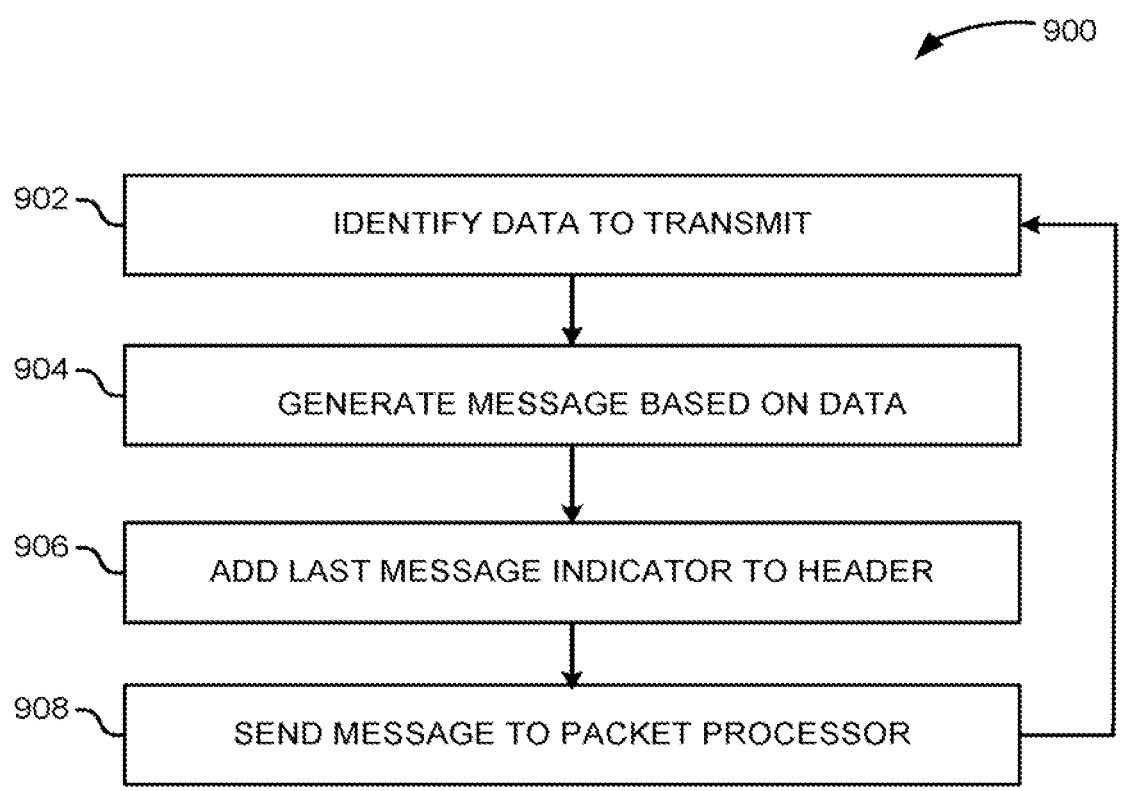
FIG. 9 sets forth a flow diagram of method steps for generating data messages, according to various additional embodiments.

FIG. 9 sets forth a flow diagram of method steps for generating data messages, according to various additional embodiments. Although the method steps are described in conjunction with the systems of FIGS. 1, 2, and/or 8, persons skilled in the art will understand that any system can be configured to perform the method steps in any order.

As shown, a method 900 begins at step 902 where software application 842 executing on processor 820 identifies data to be transmitted. In some embodiments, the data can correspond to data acquired by network device 800 as network device 800 performs operations such as data acquisition and/or other processing.

At a step 904, software application 842 generates one or more messages based on the data identified during step 902. For example, software application 842 can add some or all of the identified data to a payload of a message. In some embodiments, software application 842 can further add one or more headers to the message to provide commands and/or other information for use by packet processor 830.

At a step 906, software application 842 adds a last message indicator to a header of the message. The last message indicator informs packet processor 830 as to whether this is a last message from software application 842 or whether packet processor 830 should expect to receive one or more additional messages after this message. For example, software application 842 can use an EOT bit or field in a header of the message to indicate whether the message is a last message or not.

At a step 908, software application 842 sends the message to packet processor 830. Software application 842 sends the message to packet processor 830 using a communication path (e.g., a bus and/or I/O port) between processor 820 and packet processor 830. Software application 842 then repeats method 900 by returning to step 902 to identify additional data to transmit. Additionally and/or alternatively software application 842 can return to step 902 when previously identified data takes more than one message to send the identified data to packet processor 830.

Figure 10:
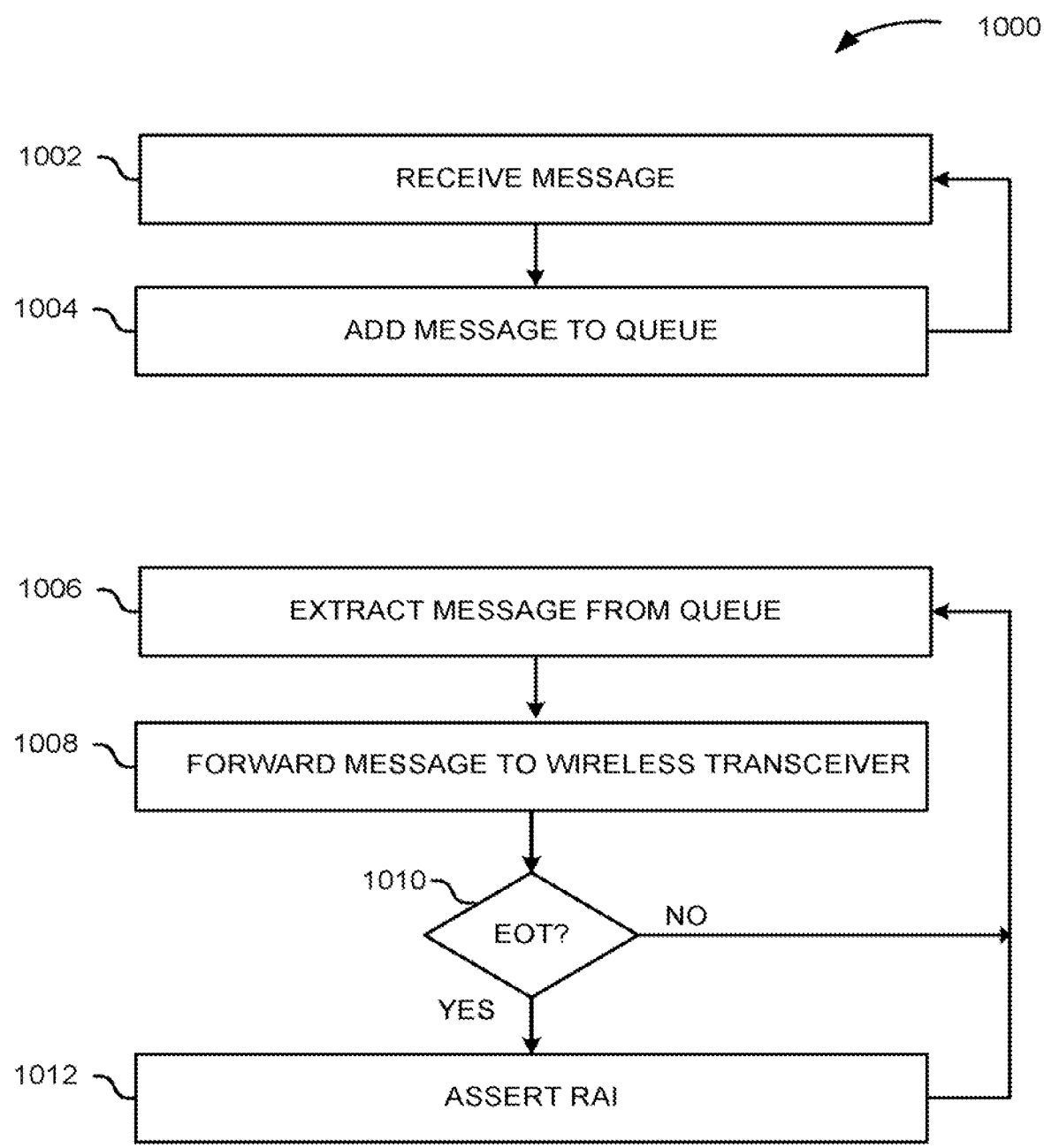
FIG. 10 sets forth a flow diagram of method steps for asserting a release assistance indication, according to various additional embodiments.

FIG. 10 sets forth a flow diagram of method steps for asserting a release assistance indication, according to various additional embodiments. Although the method steps are described in conjunction with the systems of FIGS. 1, 2, 8, and/or 9, persons skilled in the art will understand that any system can be configured to perform the method steps in any order. As shown, a method 1000 includes two separate threads that can be performed concurrently. A first one of the threads includes steps 1002 and 1004, and a second one of the threads includes steps 1006-1012.

As shown, the first thread of method 1000 begins at step 1002 where packet processor 830 receives a message. Packet processor 830 receives the message using a communication path (e.g., a bus and/or I/O port) coupled to packet processor 830. In some embodiments, the message can be a message sent by software application 842 during step 908. In some examples, the message can include a payload with data that software application 842 would like to have transmitted wirelessly.

At a step 1004, packet processor 830 adds the message received during step 1002 to a queue, such as a FIFO queue. The first thread of method 1000 then returns to step 1002 to receive another message.

As shown, the second thread of method 1000 begins at a step 1006, where packet processor 830 extracts a message from the queue. For example, packet processor 830 can extract the message from the queue in FIFO order from among the messages that were added to the queue by step 1004. In some embodiments, packet processor 830 extracts the message from the queue only when a current data session window is open.

At a step 1008, packet processor 830 forwards the message extracted during step 1006 to wireless transceiver 850. In some embodiments, packet processor 830 can optionally remove some or all of the headers from the message before forwarding the message to wireless transceiver. In some embodiments, packet processor 830 can use a UART similar to UART 434 and/or UART 634 to forward the message to wireless transceiver 850.

At a process 1010, packet processor 830 examines the message to determine whether the message is a last message to be transmitted. In some embodiments, packet processor 830 can determine whether the message is a last message by examining a header of the message. For example, packet processor 830 can determine whether the message is a last message by examining an EOT bit or field in the header. When the message is not a last message, the second thread of method 1000 returns to step 1006 to process a next message in the queue. When the message is a last message, the second thread of method 1000 proceeds to a step 1012.

At step 1012, packet processor 830 begins the process for asserting RAI. In some examples, packet processor 830 sends an RAI command signal to wireless transceiver 850 using an I/O pin to instruct wireless transceiver 850 to assert RAI. In some examples, packet processor 830 can send a command to wireless transceiver 850 instructing wireless transceiver 850 to assert RAI and transition to the lower power state. In some examples, packet processor 830 can embed an RAI bit or other flag (e.g., in the header) of the last message forwarded to wireless transceiver 850 during step 1008 and/or leave the EOT bit and/or field in the header of the message forwarded to wireless transceiver 850 during step 1008 to indicate that RAI can be asserted and the wireless transceiver 850 transitioned to the low power state after transmission of the data packet is complete. Packet processor 830 can then repeat the second thread of method 1000 for a next data session window by returning to step 1006.

In sum, a network device transmits data to other devices in a network during an assigned data session window using a transceiver. Instead of keeping the transceiver operating in a high power state for the entire data session window, when the network device no longer has data to transmit, the network device uses various techniques to have the transceiver end the data session window early, which allows the transceiver to switch to a lower power state. For example, the transceiver can inform another device in a 3GPP network that the transceiver is ending a data session window early by asserting release assistance indication (RAI) with the another device. The network device sends data to be transmitted to the transceiver during a data session window. When the network device has no more data to transmit, the network device sends a command signal to the transceiver on an input/output pin coupled to the transceiver to have the transceiver end the data session window early. Alternatively, the network device can send a command to the transceiver or send a bit or flag with the data sent to the transceiver to have the transceiver end the data session window early. In some embodiments, the network device can further confirm that the transceiver has sent all the data previously provided to the transceiver before having the transceiver end the data session window.

In some embodiments, the network device places data to be transmitted by the transceiver in a queue. As the transceiver is able to transmit data, data is removed from the queue and sent to the transceiver. A module monitors the amount of data in the queue and, when the amount of data falls below a threshold (e.g., the queue becomes empty), the module sends a command signal to the transceiver on an input/output pin coupled to the transceiver to have the transceiver end the data session window early. Alternatively, the module can send a command to the transceiver or send a bit or flag with the data sent to the transceiver to have the transceiver end the data session window early.

In some embodiments, the network device uses a packet processor to communicate with the transceiver. As the network device has data to be transmitted, the network device creates one or more messages that are sent to the packet processor. Each of the messages includes a header indicating whether the message is a last message to be sent or whether there are additional messages for sending. The packet processor sends data from each of the messages to the transceiver for transmission and checks the header of each message to see whether the message is a last message. When the message is a last message, the packet processor sends a command signal to the transceiver on an input/output pin coupled to the transceiver to have the transceiver end the data session window early. Alternatively, the packet processor can send a command to the transceiver, send a bit or flag with the data sent to the transceiver, or pass the header with the last message indicator to the transceiver to have the transceiver end the data session window early.

At least one technical advantage of the disclosed techniques relative to the prior art is that, with the disclosed techniques, a network device is able to save significant power by asserting RAI to end a data session window early to allow a transceiver of the network device to consume less power. By saving power, an effective battery lifetime of the network device can be substantially extended. Additionally and/or alternatively, the power savings can also allow a network device to achieve a same effective battery lifetime using a smaller and/or less expensive battery than a network device not using the disclosed techniques. These technical advantages represent one or more technological improvements over prior art approaches.

1. In some embodiments, a computer-implemented method for transmitting data includes identifying data to be transmitted, adding the data to a queue, and in response to a data session window being open: extracting the data from the queue; transmitting the extracted data to a transceiver via a transmitter; monitoring an amount of data in the queue and determining that the transmitter has transmitted the extracted data to the transceiver; and in response, instructing the transceiver to end the data session window early and transition to a lower power state.
2. The method of clause 1, wherein the transmitter is a universal asynchronous receiver transmitter (UART).
3. The method of clause 1 or 2, wherein determining whether the transmitter has transmitted the data to the transceiver comprises delaying for a configurable period of time.
4. The method of any of clauses 1-3, wherein instructing the transceiver to end the data session window early comprises instructing the transceiver to initiate a release assistance indication (RAI) with a base station.
5. The method of any of clauses 1-4, wherein instructing the transceiver to end the data session window early comprises sending a command signal on an input/output pin coupled to the transceiver.
6. The method of any of clauses 1-5, wherein instructing the transceiver to end the data session window early comprises sending a command to the transceiver.
7. The method of any of clauses 1-6, wherein sending the command to the transceiver comprises placing the command in the queue.
8. The method of any of clauses 1-7, wherein instructing the transceiver to end the data session window early comprises transmitting a bit or flag with the data transmitted to the transceiver.
9. The method of any of clauses 1-8, wherein monitoring the amount of data in the queue comprises determining whether the queue is empty.
10. The method of any of clauses 1-9, wherein the transceiver is a wireless transceiver, a cellular modem, or a cellular radio.
11. In some embodiments, one or more non-transitory computer-readable media storing program instructions that, when executed by one or more processors, cause the one or more processors to perform the steps of identifying data to be transmitted, adding the data to a queue, and in response to a data session window being open: extracting the data from the queue; transmitting the extracted data to a transceiver via a transmitter; monitoring an amount of data in the queue and determining that the transmitter has transmitted the extracted data to the transceiver; and in response, instructing the transceiver to end the data session window early and transition to a lower power state.
12. The one or more non-transitory computer-readable media of clause 11, wherein the transmitter is a universal asynchronous receiver transmitter (UART).
13. The one or more non-transitory computer-readable media of clause 11 or 12, wherein instructing the transceiver to end the data session window early comprises instructing the transceiver to initiate a release assistance indication (RAI) with a base station.
14. The one or more non-transitory computer-readable media of any of clauses 11-13, wherein instructing the transceiver to end the data session window early comprises sending a command signal on an input/output pin coupled to the transceiver.
15. The one or more non-transitory computer-readable media of any of clauses 11-14, wherein the input/output pin is coupled to a programmable pin on the transceiver.
16. The one or more non-transitory computer-readable media of any of clauses 11-15, wherein instructing the transceiver to end the data session window early comprises placing a command to be sent to the transceiver in the queue or transmitting a bit or flag with the data transmitted to the transceiver.
17. The one or more non-transitory computer-readable media of any of clauses 11-16, wherein monitoring the amount of data in the queue comprises determining whether the queue is empty.
18. The one or more non-transitory computer-readable media of any of clauses 11-17, wherein the queue is a hardware queue.
19. The one or more non-transitory computer-readable media of any of clauses 11-18, wherein the transceiver is a wireless transceiver, a cellular modem, or a cellular radio.
20. In some embodiments, a computing device includes a queue, a transmitter coupled to a transceiver, a memory storing instructions, and a processor that is coupled to the memory. When executing the instructions the processor performs steps comprising identifying data to be transmitted; adding the data to the queue; and in response to a data session window being open: extracting the data from the queue; transmitting the extracted data to the transceiver via the transmitter; monitoring an amount of data in the queue and determining that the transmitter has transmitted the extracted data to the transceiver; and in response, instructing the transceiver to end the data session window early and transition to a lower power state.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
   identifying, by one or more processors of a computing device included in a network device, data to be transmitted, wherein the computing device includes the one or more processors, a queue, and a transmitter, and wherein the network device includes the computing device and a transceiver that is configured to transmit data outside of the network device;
   adding, by the one or more processors, the data to the queue; and
   during an open data session window:
      transmitting, via the transmitter and to the transceiver, data extracted from the queue; and
      in response to the one or more processors determining that an amount of data in the queue is below a threshold, (a) delaying for a period of time, and (b) after the period of time, instructing the transceiver to end the open data session window early and transition to a lower power state.

2. The method of claim 1, wherein the transmitter is a universal asynchronous receiver transmitter (UART).

3. The method of claim 1, wherein instructing the transceiver to end the open data session window early comprises instructing the transceiver to initiate a release assistance indication (RAI) with a base station.

4. The method of claim 1, wherein instructing the transceiver to end the open data session window early comprises sending a command signal on an input/output pin coupled to the transceiver.

5. The method of claim 1, wherein instructing the transceiver to end the open data session window early comprises sending a command to the transceiver.

6. The method of claim 5, wherein sending the command to the transceiver comprises placing the command in the queue.

7. The method of claim 1, wherein instructing the transceiver to end the open data session window early comprises transmitting a bit or flag with the data transmitted to the transceiver.

8. The method of claim 1, wherein monitoring the amount of data in the queue comprises determining whether the queue is empty.

9. The method of claim 1, wherein the transceiver is a wireless transceiver, a cellular modem, or a cellular radio.

10. One or more non-transitory computer-readable media storing program instructions that, when executed by one or more processors of a node in a wireless network, cause the one or more processors to perform operations comprising:
    receiving data to be transmitted;
    storing the data in a buffer; and
    while a communication time slot is open:
       remove data from the buffer;
       send, using a transmitter of the node, the data removed from the buffer to a wireless transceiver of the node, wherein the wireless transceiver is configured to send the data removed from the buffer to another device in the wireless network; and
       in response to determining that an amount of data remaining in the buffer is below a threshold amount, (a) waiting for a delay period, and (b) after waiting, commanding the wireless transceiver to end the communication time slot early and transition to a lower power mode.

11. The one or more non-transitory computer-readable media of claim 10, wherein the transmitter is a universal asynchronous receiver transmitter (UART).

12. The one or more non-transitory computer-readable media of claim 10, wherein commanding the wireless transceiver to end the communication time slot early comprises commanding the wireless transceiver to initiate a release assistance indication (RAI) with a base station.

13. The one or more non-transitory computer-readable media of claim 10, wherein commanding the wireless transceiver to end the communication time slot early comprises:
   asserting a signal on an input/output pin coupled to the wireless transceiver; or
   placing a command to be sent to the wireless transceiver in the buffer; or
   including a bit or flag with the data sent to the wireless transceiver.

14. The one or more non-transitory computer-readable media of claim 10, wherein determining the amount of data remaining in the buffer is below the threshold amount comprises determining that there is no data in the buffer.

15. The one or more non-transitory computer-readable media of claim 11, wherein the wireless transceiver is a cellular modem or a cellular radio.

16. A networking device comprising:
   a wireless radio configured to exchange information wirelessly with a second network device; and
   a computing system separate from the wireless radio, the computing system comprising:
      a queue;
      a transmitter coupled to the wireless radio;
      one or more processing devices; and
      one or more memories storing instructions that when executed by the one or more processing device cause the computing system to perform operations comprising:
         obtaining data;
         pushing the data into the queue; and
         while a data transmission window is active:
            pulling data from the queue;
            transmitting the data pulled from the queue to the wireless radio using the transmitter;
            determining an amount of data stored in the queue; and
            in response to detecting that the amount of data stored in the queue is below a minimum threshold, (a) waiting for a period of time; and (b) after the period of time elapses, sending an instruction to the wireless radio to end the data transmission window early and switch to a lower power state.

17. The networking device of claim 16, wherein the instruction to the wireless radio to end the data transmission window early comprises an instruction to the wireless radio to send a release assistance indication (RAI) to the second networking device.

18. The networking device of claim 16, wherein the queue is a hardware queue.

19. The networking device of claim 16, wherein sending the instruction to the wireless radio comprises:
   providing a command signal on an input/output pin coupled to the wireless radio; or
   pushing, into the queue, a command to be transmitted to the wireless radio; or
   setting a bit or flag in the data transmitted to the wireless radio.

20. The networking device of claim 19, wherein the input/output pin is programmable.

* * * * *